(12) United States Patent
Leong et al.

(10) Patent No.: US 11,585,651 B2
(45) Date of Patent: *Feb. 21, 2023

(54) OPTICAL POSITIONING SYSTEM HAVING HIGH RESOLUTION

(71) Applicant: PixArt Imaging Inc., Hsin-Chu County (TW)

(72) Inventors: Keen-Hun Leong, Penang (MY); Tong-Sen Liew, Penang (MY); Ching-Geak Chan, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,621

(22) Filed: Jul. 20, 2021

(65) Prior Publication Data

US 2021/0348916 A1 Nov. 11, 2021

Related U.S. Application Data

(63) Continuation of application No. 16/662,606, filed on Oct. 24, 2019, now Pat. No. 11,105,608.

(51) Int. Cl.
*G01B 11/04* (2006.01)
*G01B 21/04* (2006.01)
*G06F 3/03* (2006.01)

(52) U.S. Cl.
CPC .......... *G01B 11/046* (2013.01); *G01B 21/047* (2013.01); *G06F 3/0317* (2013.01)

(58) Field of Classification Search
CPC ........................... G01D 5/34746; B01B 3/004
USPC ........................................... 33/706, 707, 708
See application file for complete search history.

(56) References Cited

U.S. PATENT DOCUMENTS

| | | | |
|---|---|---|---|
| 10,508,936 B2* | 12/2019 | Kirsch | B66C 13/46 |
| 11,105,608 B2* | 8/2021 | Leong | G01D 5/34 |
| 2005/0051715 A1* | 3/2005 | Okada | G01D 5/34746 250/231.13 |
| 2008/0315135 A1* | 12/2008 | Okada | G01D 5/34746 250/559.32 |
| 2009/0206244 A1* | 8/2009 | Bahari | G01D 5/34746 250/231.13 |
| 2017/0176219 A1* | 6/2017 | Kimura | G01D 5/38 |
| 2020/0011712 A1* | 1/2020 | Mckendrick | G01D 5/34 |
| 2020/0319001 A1* | 10/2020 | Kato | G01D 5/34746 |
| 2020/0378803 A1* | 12/2020 | Kimura | G01D 5/34715 |

* cited by examiner

*Primary Examiner* — George B Bennett
(74) *Attorney, Agent, or Firm* — WPAT, PC

(57) ABSTRACT

There is provided an operating method of an optical positioning system including: capturing an image frame of a detected surface, which has interleaved bright regions and dark regions, using a field of view and a shutter time of an optical sensor; counting a number of edge pairs between the bright regions and the dark regions that the field of view passes; calculating an average value of the image frame; calculating a ratio between the calculated average value and the shutter time; determining that the field of view is aligned with one of the dark regions when the ratio is smaller than a ratio threshold; and determining that the field of view is aligned with one of the bright regions when the ratio is larger than the ratio threshold.

20 Claims, 7 Drawing Sheets

OPTICAL POSITIONING SYSTEM HAVING HIGH RESOLUTION

CROSS REFERENCE TO RELATED APPLICATION

This application is a continuation application of U.S. application Ser. No. 16/662,606, filed Oct. 24, 2019, the full disclosure of which is incorporated herein by reference.

BACKGROUND

1. Field of the Disclosure

This disclosure generally relates to an optical positioning system and, more particularly, to an optical positioning system having a higher resolution than positioning based on mark edges only.

2. Description of the Related Art

The optical positioning device is used to detect a position thereof corresponding to a strip or a rotation angle of a shaft, and has the benefits of a small size and low power. Furthermore, as a probe head of the optical positioning device is not directly in contact with the surface under detection, there will be no abrasion to the probe head.

An optical positioning device having a high resolution is required.

SUMMARY

The present disclosure provides an optical positioning system that can determine a current position at mark edges and between mark edges to increase the resolution twofold.

The present disclosure further provides an optical positioning system that determines a current position using different formulas corresponding to a dark-to-bright edge, a bright-to-dark edge, a bright region or a dark region on a surface under detection.

The present disclosure provides an optical positioning system including a detected surface, an optical sensor and a processor. The detected surface has interleaved bright regions and dark regions arranged in a transverse direction, and the bright regions and the dark regions have an identical width in the transverse direction. The optical sensor is configured to capture an image frame of the detected surface within a field of view thereof and using a shutter time, wherein the detected surface and the optical sensor are configured to have a relative movement in the transverse direction. The processor is configured to calculate an average value of the image frame, determine whether the field of view is aligned with an edge between the bright regions and the dark regions according to a brightness distribution in the image frame, and compare a ratio between the average value and the shutter time with a ratio threshold to determine whether the field of view is aligned with one of the bright regions or the dark regions.

The present disclosure further provides an optical positioning system including a detected surface, an optical sensor, a counter, a register and a processor. The detected surface has interleaved bright regions and dark regions arranged in a transverse direction, and the bright regions and the dark regions have an identical width in the transverse direction. The optical sensor is configured to capture an image frame of the detected surface within a field of view thereof and using a shutter time, wherein the detected surface and the optical sensor are configured to have a relative movement in the transverse direction. The counter is configured to count a number of edge pairs between the bright regions and the dark regions that the field of view passes. The register is configured to record a type of a last passed edge. The processor is configured to compare a ratio between the average value and the shutter time with a ratio threshold to determine whether the field of view is aligned with one of the bright regions or the dark regions, and determine a half position according to the counted number of edge pairs, the last passed edge and the ratio when the field of view is determined to be aligned with one of the bright regions or the dark regions.

The present disclosure further provides an optical positioning system including a detected surface, an optical sensor, a counter and a processor. The detected surface has interleaved bright regions and dark regions arranged in a transverse direction, and the bright regions and the dark regions having an identical width in the transverse direction. The optical sensor is configured to capture image frames of the detected surface within a field of view thereof and using a shutter time, wherein the detected surface and the optical sensor are configured to have a relative movement in the transverse direction. The counter is configured to count a number of edge pairs between the bright regions and the dark regions that the field of view passes. The processor is configured to calculate an average value of a current image frame and a moving direction according to multiple image frames, compare a ratio between the average value and the shutter time with a ratio threshold to determine whether the field of view is aligned with one of the bright regions or the dark regions, and determine a half position according to the counted number of edge pairs, the moving direction and the ratio when the field of view is determined to be aligned with one of the bright regions or the dark regions.

In the present disclosure, the integer position is referred to a position corresponding to mark edges, and the half position is referred to a position within bright regions or dark regions.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure provides an optical positioning system capable of detecting an absolute position even when the field of view (FOV) of an optical sensor does not see an edge of marks. Furthermore, the optical positioning system of the present disclosure further distinguishes whether the field of view of an optical sensor is focused on a mark or on a space between two marks according to an average value of one image frame to a shutter time for capturing said image frame. In this way, the positional resolution of the optical positioning system is increased twofold.

Figure 1:
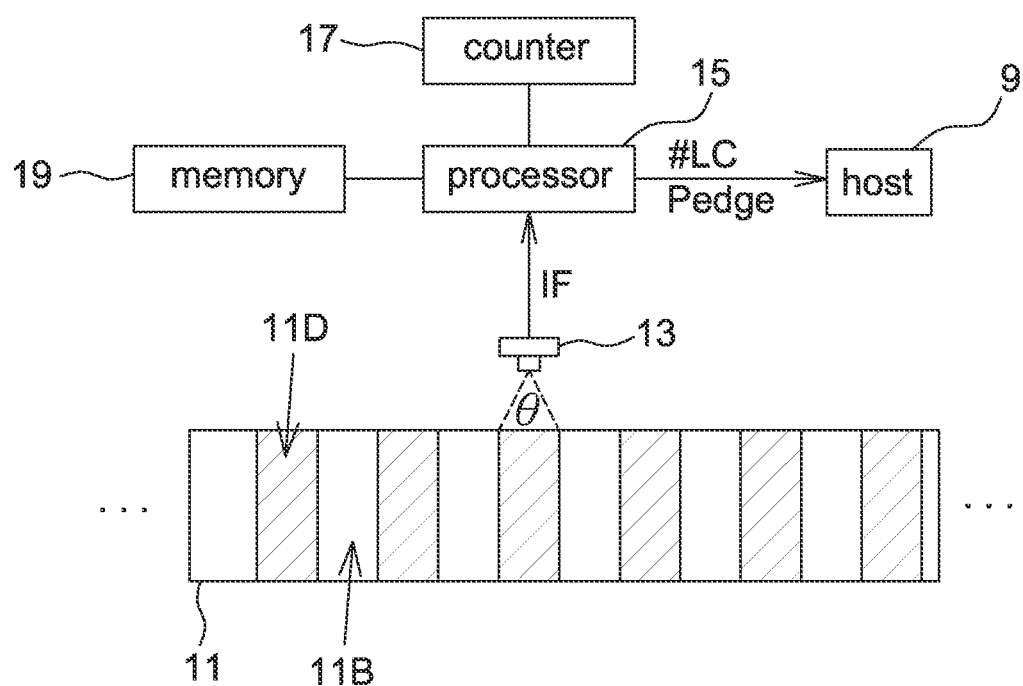
FIG. 1 is a schematic diagram of an optical positioning system according to one embodiment of the present disclosure.

Referring to FIG. 1, it is a schematic diagram of an optical positioning system 100 according to one embodiment of the present disclosure. The optical positioning system 100 includes a detected surface 11, an optical sensor 13, a processor 15, a counter 17 and a memory 19.

It should be mentioned that although FIG. 1 shows that the counter 17 and the memory 19 are separated from the processor 15, the present disclosure is not limited thereto. In other aspects, the counter 17 and the memory 19 are integrated in the processor 15, i.e. operations of the counter 17 and the memory 19 being executed by the processor 15.

In some aspects, the optical positioning system 100 of the present disclosure is wired or wirelessly coupled to an external host 9 that calculates an absolute position according to a number of edge pairs (shown as #LC) being counted and a type of last passed edge (shown as Pedge) outputted by the processor 15, e.g., according to formulas mentioned below, and performs a corresponding control according to the calculated absolute position. The control performed by the host 9 is known to the art and is not a main objective of the present disclosure, and thus details thereof are not described herein. In this case, the formulas (1) to (5) mentioned below are embedded in the host 9.

In some aspects, the processor 15 directly calculates a position or an angle according to a line number (e.g., #LC) and a last see edge (e.g., Pedge), and then outputs the calculated position or angle to the host 9 for the corresponding control. That is, the formulas (1) to (5) mentioned below are embedded in the optical positioning system 100, e.g., stored in the memory 19.

The detected surface 11 is a surface of a strip (e.g., a plane surface) or a shaft (e.g., a curved surface) on which interleaved bright regions (blank rectangles) 11B and dark regions (filled rectangles) 11D are arranged in a transverse direction, e.g., a left-right direction in FIG. 1. In the case that the bright regions 11B and the dark regions 11D are arranged on a shaft surface, the transverse direction is referred to a rotation direction of the shaft. To simplify the calculation of a current position, the bright regions 11B and the dark regions 11D have an identical width in the transverse direction, e.g., FIGS. 2-5 taking 1 mm as an example for illustration purposes. By sputtering or coating a plurality of marks (i.e., dark regions 11D herein) separated by a predetermined distance (e.g., the mark width) on the detected surface 11, it is able to form the interleaved bright regions 11B and dark regions 11D as shown in FIG. 1.

It should be mentioned that the dark regions 11D mentioned herein are not limited to be black color as long as the dark regions 11D have lower reflectivity than the bright regions 11B. Accordingly in other aspects, by sputtering or coating a plurality of reflecting layers (i.e., bright regions 11B herein), separated by a predetermined distance (e.g., a width of reflecting layers) on the detected surface 11, it is also possible to form the interleaved bright regions 11B and dark regions 11D as shown in FIG. 1. More specifically, materials and manufacturing of the bright regions 11B and dark regions 11D are not particularly limited as long as the bright regions 11B and dark regions 11D are distinguishable in the captured image frame, shown as IF in FIG. 1.

The optical sensor 13 is a CCD image sensor, a CMOS image sensor or the like, and has a field of view (FOV) having a range θ as shown in FIG. 1. In the present disclosure, the field of view of the optical sensor 13 in the transverse direction is preferably smaller than the identical width (i.e. the mark width). The relationship between the field of view of the optical sensor 13 in a direction perpendicular to the transverse direction and a height of marks is not particularly limited.

The optical sensor 13 captures every image frame IF of the detected surface 11 within a field of view θ thereof and using a shutter time. The shutter time is determined by auto exposure of the optical sensor 13, and the auto exposure mechanism of optical sensor is known to the art and thus details thereof are not described herein. When the optical positioning system 100 is in operation, the detected surface 11 and the optical sensor 13 have a relative movement in the transverse direction no matter which of the detected surface 11 or the optical sensor 13 is actually in motion.

The counter 17 counts a number of edge pairs between the bright regions 11B and the dark regions 11D that the field of view of the optical sensor 13 passes. In the case that the optical sensor 13 is arranged right above the detected surface 11 and facing the detected surface 11 perpendicularly, the field of view of the optical sensor 13 overlaps the optical sensor 13 in the vertical direction such that when an edge passes the FOV, said edge also passes the optical sensor 13.

In the present disclosure, a type of edge is determined or calculated by the processor 15. For example, a bright-to-dark edge (shown as B2DE in FIGS. 2-5) is determined when brightness of a left part of the image frame IF captured by the optical sensor 13 is higher than that of a right part of the image frame IF; and a dark-to-bright edge is determined (shown as D2BE in FIGS. 2-5) when brightness of the left part of the image frame IF is lower than that of the right part of the image frame IF. The definition of the B2DE and D2BE may be arranged in opposite.

Figure 2:
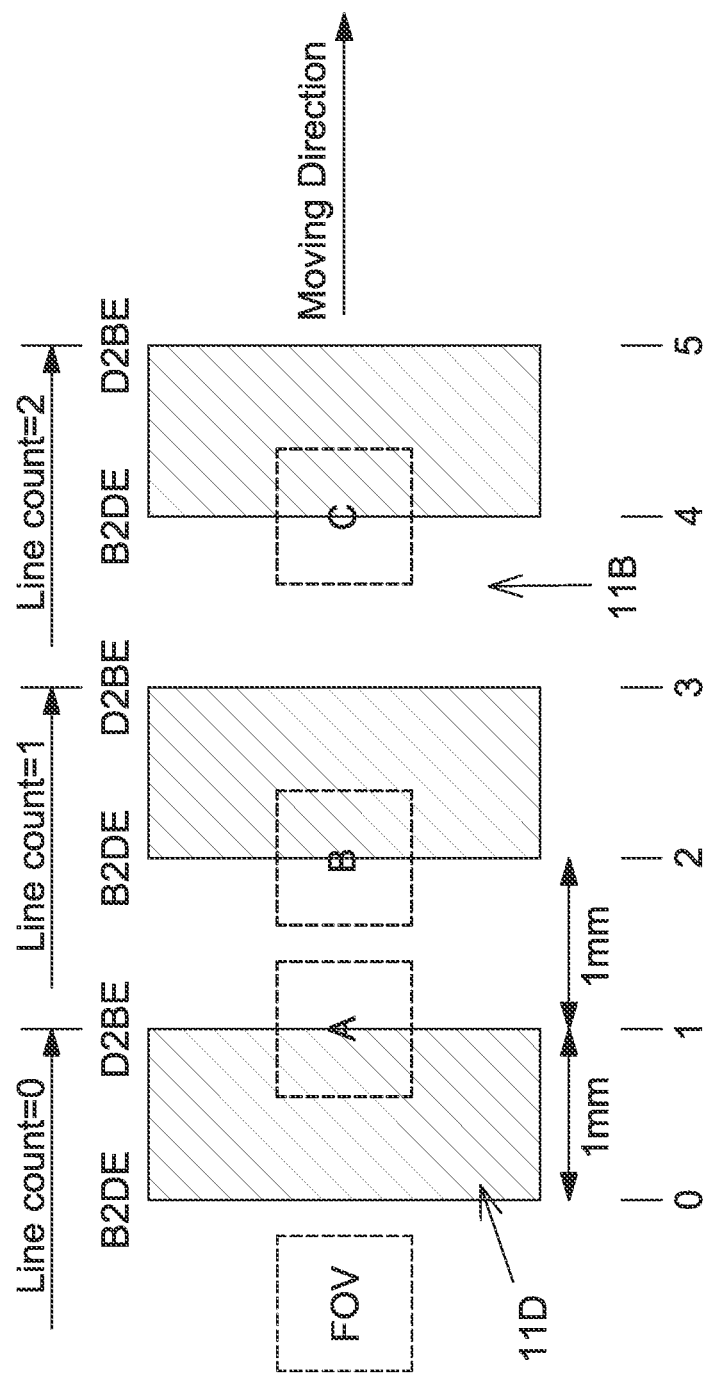
FIG. 2 is an operational schematic diagram of an optical positioning system according to one embodiment of the present disclosure.
Figure 3:
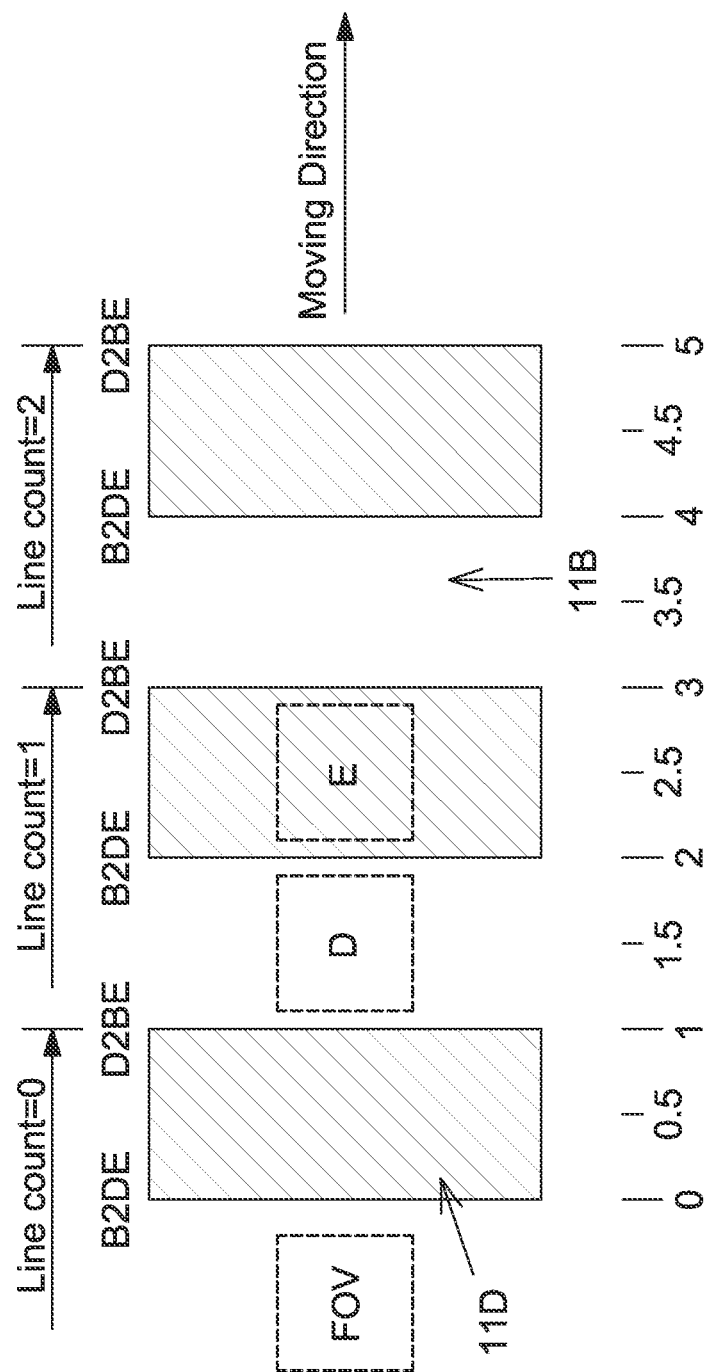
FIG. 3 is another operational schematic diagram of an optical positioning system according to one embodiment of the present disclosure.
Figure 4:
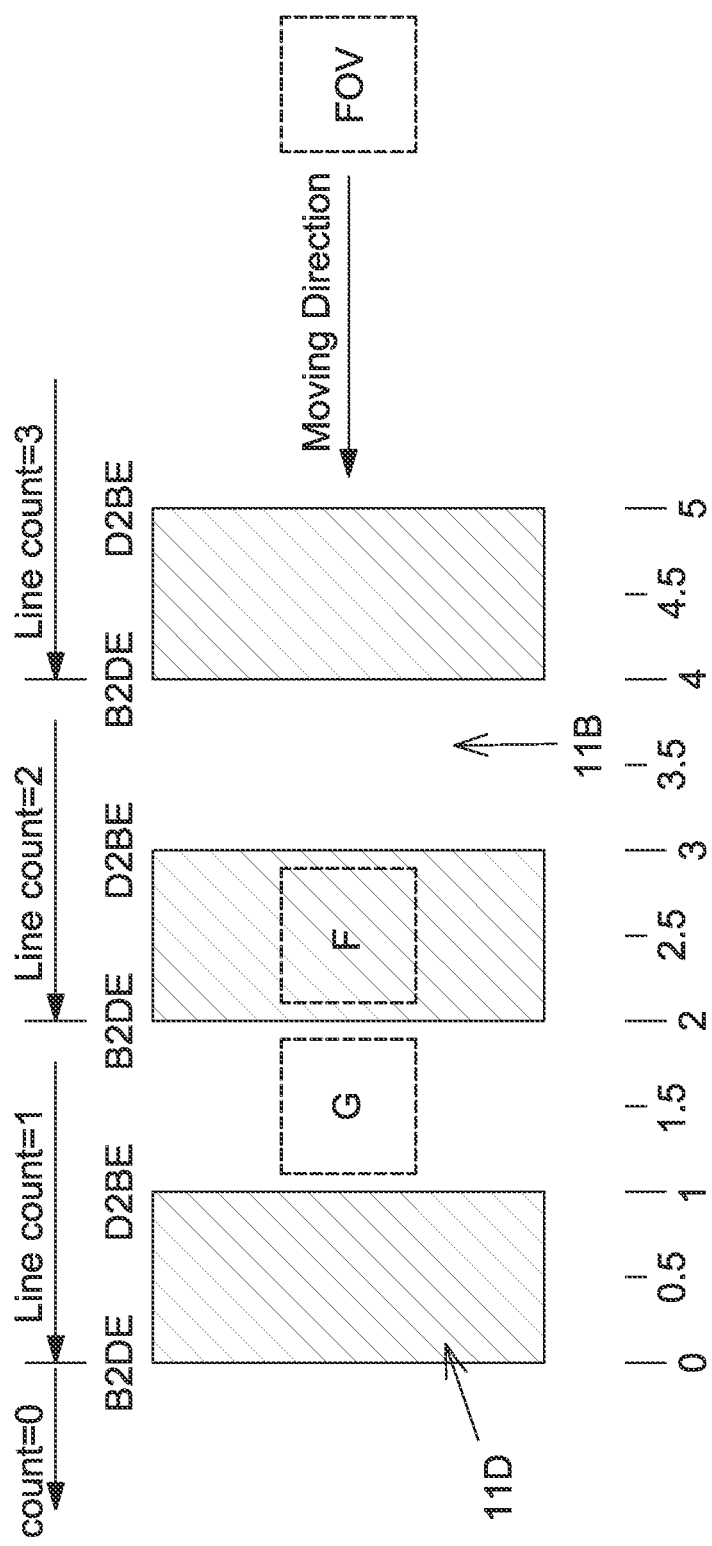
FIG. 4 is an alternative operational schematic diagram of an optical positioning system according to one embodiment of the present disclosure.

Referring to FIGS. 2 to 4, they are operational schematic diagrams of an optical positioning system 100 according to some embodiments of the present disclosure. For example, if the field of view of the optical sensor 13 sequentially passes a bright-to-dark edge and a dark-to-bright edge, the counter 17 increases a number of edge pairs (i.e. line count) by 1 as shown in FIG. 2. On the other hand, if the field of view of the optical sensor 13 sequentially passes a dark-to-bright edge and a bright-to-dark edge, the counter 17 decreases a number of edge pairs (i.e. line count) by 1 as shown in FIG. 4. That is, the edge pairs herein include two different edges D2BE and B2DE. The increment and decrement of the counted number of edge pairs may be arranged in opposite.

Figure 5:
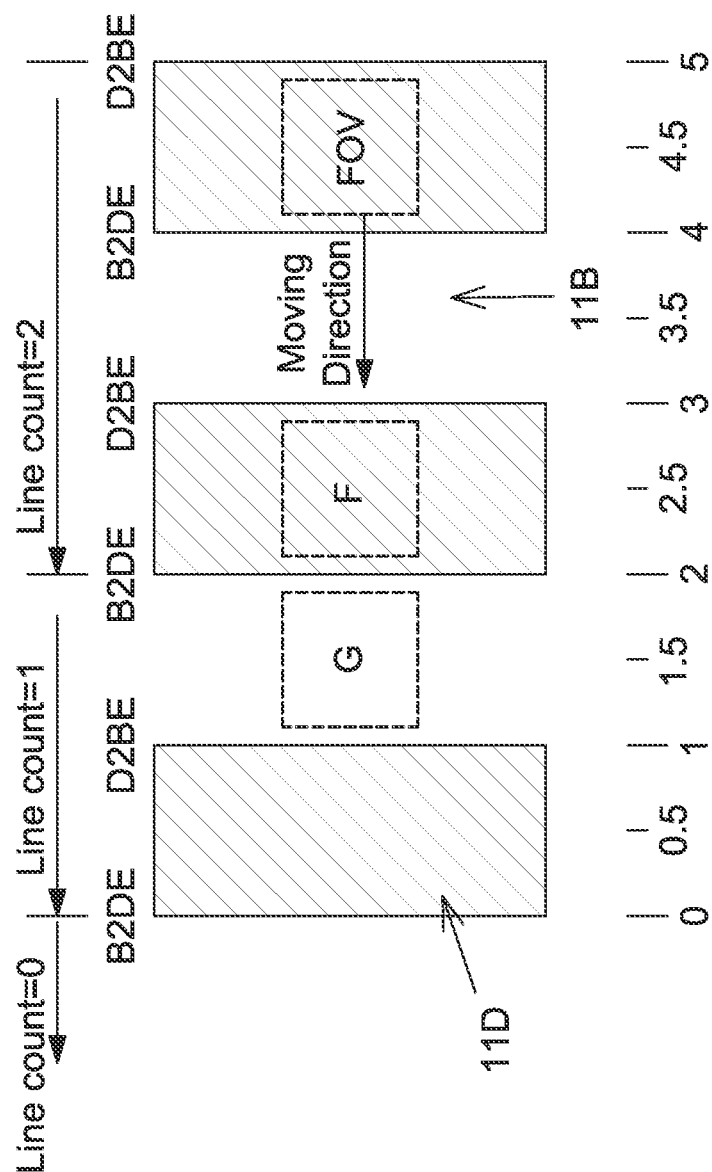
FIG. 5 is an alternative operational schematic diagram of an optical positioning system according to one embodiment of the present disclosure.

FIG. 5 shows that the FOV moves from left to right at first and then stops at position 4.5. As mentioned above since the FOV passes two edge pairs, the counted number of edge pairs is equal to 2. Although the FOV also passes another B2DE at position 4, the line count is not increased by passing only one edge. After that, the FOV moves back from right to left, and then passes the B2DE at position 4 again. In this moment, the line count is not decreased or increased since the predetermined edge pairs (i.e. two different edges) are not recognized by the processor 13. After that, when the FOV passes D2BE at position 3 and B2DE at position 2, the line count is decreased by 1, and so on.

In the present disclosure, the optical positioning system 100 further includes a register, arranged in or out of the processor 15, for recording a type of a last passed edge. For example, the register uses a digital value "1" to indicate the last passed edge as a B2DE (or D2BE), and uses another digital value "0" to indicate the last passed edge as a D2BE (or B2DE). It is appreciated that a bit number recorded by the register is not limited to one bit. For example in FIG. 3, if the FOV is focused on E, the last passed edge is B2DE at position 2 since the moving direction is toward right. On the contrary, if the FOV is focused on F as shown in FIGS. 4 and 5, the last passed edge is D2BE at position 3 since the moving direction is toward left.

The processor 15 is an application specific integrated circuit (ASIC), digital signal processor (DSP) or a microcontroller unit (MCU). In addition to determine an edge type (B2DE and D2BE) as mentioned above, the processor 15 further calculates an average value of the image frame IF captured by the optical sensor 13, wherein the average value is an average raw data or average gray levels of all pixels of the image frame IF. As shown in FIGS. 2-5, the processor 13 distinguishes the position of FOV being aligned with an edge or not aligned with any edge so as to select the formula for calculation.

As mentioned above, the processor 15 determines whether the field of view is aligned with an edge between the bright regions 11B and the dark regions 11D according to a brightness distribution in the image frame IF acquired by the optical sensor 13. Furthermore, the processor 15 compares a ratio between an average value of the image frame IF and a shutter time of the optical sensor 13 with a ratio threshold to determine whether the field of view is aligned with one of the bright regions 11B or the dark regions 11D if it is not aligned with an edge.

The memory 19 is a volatile and/or non-volatile memory. The memory 19 is used to store the ratio threshold, parameters and algorithms (e.g., formulas if the processor 15 is responsible for calculating the position) used in operation.

In the present disclosure, the processor 15 determines an integer position according to the counted number of edge pairs without using the last passed edge or the ratio when a field of view of the optical sensor 13 is determined to be aligned with one edge. For example, when the field of view of the optical sensor 13 is aligned with a bright-to-dark edge, the processor 15 calculates the integer position using a formula (1):

$$2 \times \text{the counted number of edge pairs} - 1) \times \text{the identical width} \quad (1)$$

Referring to FIG. 2 again, for location B, the processor 15 obtains 2 mm (e.g., absolute position or relative position from position 0) by calculating (2×1)×1 mm, wherein the line count corresponding to location B is 1 and a mark width is 1 mm. For location C, the processor 15 obtains 4 mm by calculating (2×2)×1 mm since the line count corresponding to location C is 2.

However, when the field of view of the optical sensor 13 is aligned with the dark-to-bright edge, the processor 15 calculates the integer position using a formula (2):

$$(2 \times \text{the counted number of edge pairs} - 1) \times \text{the identical width} \quad (2)$$

Referring to FIG. 2 again, for location A, the processor 15 obtains 1 mm by calculating (2×1−1)×1 mm since the line count corresponding to location A is 1.

In the present disclosure, the processor 15 further determines a half position according to the number of edge pairs (i.e. line count) counted by the counter 17, the last passed edge (recorded in the register) and the ratio between an average value of the image frame IF and a shutter time of the optical sensor 13 calculated by the processor 15 when the field of view is determined to be aligned with one of the bright regions 11B or the dark regions 11D.

For example, when the ratio is larger than a ratio threshold, it means that the FOV of the optical sensor 13 is aligned with one of the bright regions 11B. The processor 15 then calculates the half position using a formula (3):

$$(2 \times \text{the counted number of edge pairs} - 0.5) \times \text{the identical width} \quad (3)$$

Referring to FIG. 3 again, for location D, the processor 15 obtains 1.5 mm by calculating (2×1−0.5)×1 mm since the line count corresponding to location D is 1. Referring to FIGS. 4 and 5 again, for location G the processor 15 obtains 1.5 mm by calculating (2×1−0.5)×1 mm since the line count corresponding to location G is also 1.

In addition, when the ratio is smaller than the ratio threshold, it means that the FOV of the optical sensor 13 is aligned with one of the dark regions 11D. In the case that the last passed edge recorded by the register is the bright-to-dark edge, the processor 15 calculates the half position using a formula (4):

$$(2 \times \text{the counted number of edge pairs} + 0.5) \times \text{the identical width} \quad (4)$$

Referring to FIG. 3 again, for location E, the processor 15 obtains 2.5 mm by calculating (2×1+0.5)×1 mm since the line count corresponding to location E is 1 and the last passed edge is B2DE.

However, when the ratio is smaller than the ratio threshold and the recorded last passed edge is the dark-to-bright edge, the processor 15 calculates the half position using a formula (5):

$$(2 \times (\text{the counted number of edge pairs} - 1) + 0.5) \times \text{the identical width} \quad (5)$$

Referring to FIGS. 4 and 5 again, for location F, the processor 15 obtains 2.5 mm by calculating (2×(2−1)+0.5)×1 mm since the line count corresponding to location F is 2 and the last passed edge is D2BE.

Figure 6:
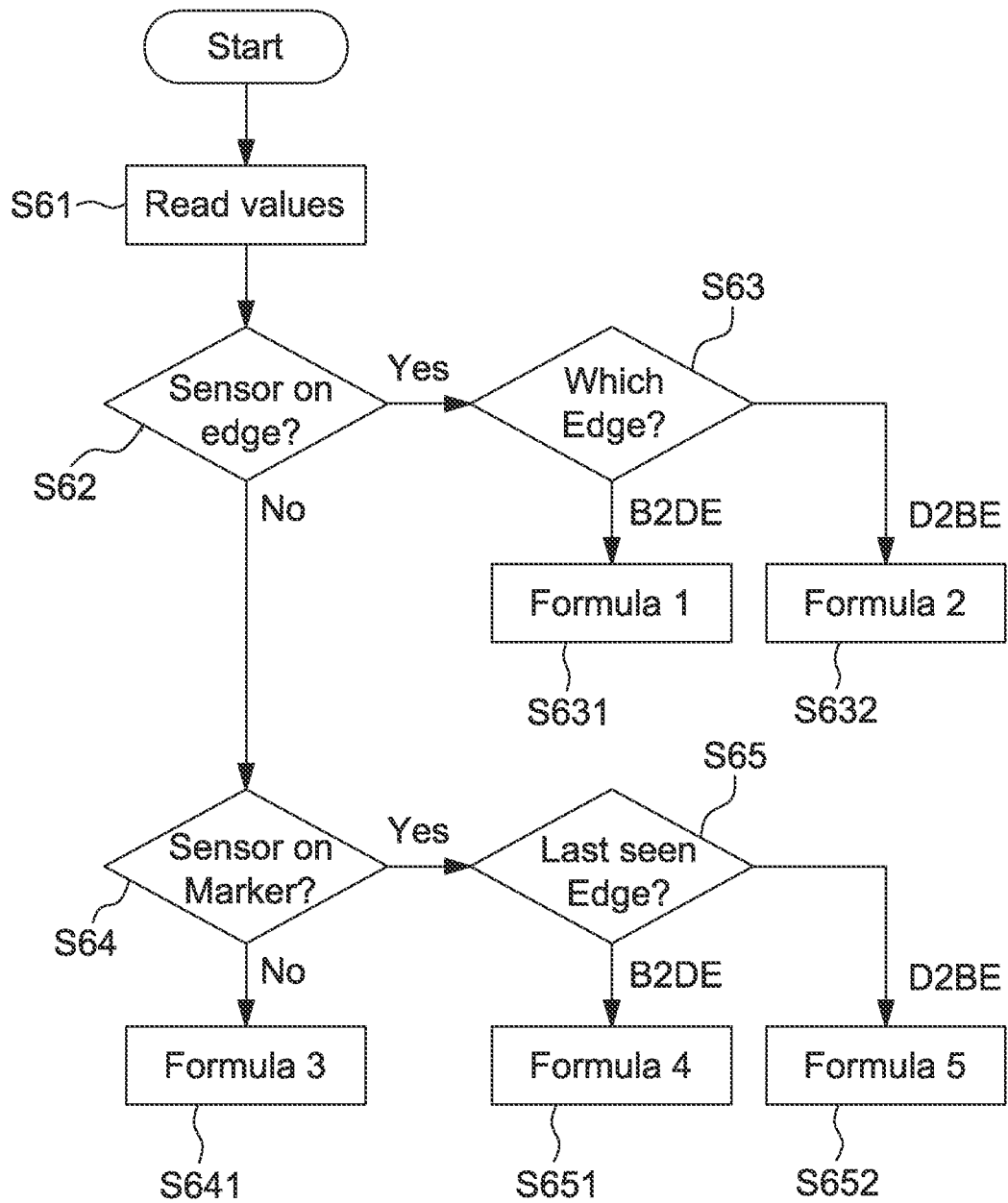
FIG. 6 is a flow chart of an operating method of an optical positioning system according to one embodiment of the present disclosure.

Referring to FIG. 6, it is a flow chart of an operating method of an optical positioning system 100 according to one embodiment of the present disclosure. In the present disclosure, the processor 15 calculates a current position using different formulas when the FOV of the optical sensor 13 is aligned with different edge types, a bright region 11B or a dark region 11D.

Step S61: When the optical positioning system 100 is in operation, the optical sensor 13 captures, at a predetermined frequency, image frames IF of the detected surface 11 within a field of view thereof using a shutter time. The processor 15 receives and reads raw data or gray levels of every pixel in every image frame IF from the optical sensor 13, and calculates an average value of every image frame IF. In addition, the counter 17 continuously counts a number of edge pairs between the bright regions 11B and the dark regions 11D that the field of view of the optical sensor 13 passes in a transverse direction.

Step S62: The processor 15 determines whether the field of view of the optical sensor 15 is aligned with an edge between the bright regions 11B and the dark regions 11D according to a brightness distribution in the image frame IF. For example, when the image frame IF contains a vertical edge between a left part (bright or dark) and a right part (dark or bright) of the image frame IF (e.g., referring to FIG. 2), the processor 15 determines that the optical sensor 15 is on one edge (assuming the optical sensor 15 overlapping the FOV).

Step S63: The processor 15 recognizes different edges as mentioned above.

Step S631: When determining that a current edge is B2DE, e.g., locations B and C in FIG. 2, the processor 15 calculates a current position using formula (1) as mentioned above.

Step S632: When determining that a current edge is D2BE, e.g., location A in FIG. 2, the processor 15 calculates a current position using formula (2) as mentioned above.

On the other hand, if the processor 15 determines that the optical sensor 15 is not on any edge, then the processor 15 determines whether the optical sensor 15 is on a dark region 11D (e.g., mark) or a bright region 11B (e.g., space).

Step S64: As mentioned above, the processor 15 calculates a ratio between an average value of the image frame IF and a shutter time of the optical sensor 13, i.e., the average value divided by the shutter time.

Step S641: When the calculated ratio is larger than a predetermined ratio threshold stored in the memory 19, the processor 15 determines that the field of view of the optical sensor 13 is aligned with one of the bright regions 11B, and calculates a current position using formula (3) as mentioned above.

Table I shows one example of the calculated average value and the shutter time when the FOV is on the mark and the space. In this case, the predetermined ratio threshold is selected as 0.75. All values in Table I are determined before shipment of the optical positioning system 100.

TABLE 1

| Location | Average Value | Shutter Time | Ratio |
|---|---|---|---|
| Mark | about 100 | about 400 | about 0.25 |
| Space | about 120 | about 80 | About 1.50 |

Step S65: When the calculated ratio is smaller than a predetermined ratio threshold stored in the memory 19, the processor 15 determines that the field of view of the optical sensor 13 is aligned with one of the dark regions 11D. The processor 15 determines a current position further according to a last passed edge recorded in the register. When the field of view of the optical sensor 13 is aligned with one of the dark regions 11D and a last passed edge is the bright-to-dark edge, the processor 15 calculates the current position using formula (4) as mentioned above. However, when the field of view of the optical sensor 13 is aligned with one of the dark regions 11D and a last passed edge is the dark-to-bright edge, the processor 15 calculates the current position using formula (5) as mentioned above.

In the above embodiment, the processor 15 determines a moving direction of a field of view of the optical sensor 13 according to a last passed edge recorded in the register. In other embodiments, the processor 15 directly calculates the moving direction according to increment or decrement of a higher brightness area, which corresponds to the bright region 11B, or a lower brightness area, which corresponds to the dark region 11D, between the captured image frames. For example, if the processor 15 continuously recognizes a dark region (i.e. lower brightness area) at a left side of successive image frames IF and an area of said dark region decreases with time, the processor 15 determines that the field of view of the optical sensor 13 moves in a right direction and the register is used to record a digital value indicating said right direction. On the contrary, if an area of said dark region increases with time, the processor 15 determines that the field of view of the optical sensor 13 moves in a left direction and the register is used to record another digital value indicating said left direction.

One of ordinary skill in the art would understand that the method of using the increment and decrement of a bright region in successive image frames IF to determine a moving direction is similar to using the dark region mentioned above, and thus details thereof are not repeated herein.

In this embodiment, arrangements of the detected surface 11, the optical sensor 13 and the counter 17 are identical to those mentioned above. The difference between this embodiment and the above embodiment is that the last passed edge is replaced by a moving direction, wherein both the last passed edge and the moving direction are obtained by the processor 15 and may be indicated by a digital value recorded in the register.

In this embodiment, the processor 15 calculates an average value of a current image frame captured by the optical sensor 13 and calculates a moving direction according to multiple image frames IF. The processor 15 determines whether the field of view is aligned with an edge between the bright regions 11B and the dark regions 11D according to a brightness distribution in the current image frame, which has been described above and thus details thereof are not repeated herein. When the field of view is determined to be aligned with one edge, the processor 15 determines and calculates an integer position according to the counted number of edge pairs without using the moving direction or the ratio, e.g., using formulas (1) and (2) in FIG. 7.

If the field of view is determined not to be aligned with any edge, the processor 15 compares a ratio between an average value of the current image frame and a shutter time of the optical sensor 13 with a ratio threshold stored in the memory 19 to determine whether the field of view of the optical sensor 13 is aligned with one of the bright regions 11B or the dark regions 11D.

The processor 15 determines a half position according to the counted number of edge pairs, the moving direction and the ratio when the field of view is determined to be aligned with one of the bright regions 11B or the dark regions 11D. For example, when the ratio is larger than the ratio threshold, it means that the optical sensor 13 is on a bright region 11B (assuming the optical sensor 13 overlapping the FOV thereof), the processor 15 calculates the half position using formula (3) as mentioned above, referring to FIG. 7.

When the ratio is smaller than the ratio threshold, it means that the optical sensor 13 is on a dark region 11D. When the moving direction is a right direction, the processor 15 calculates the half position using formula (4) as mentioned above, referring to FIG. 7. On the other hand, when the moving direction is a left direction, the processor 15 calculates the half position using formula (5) as mentioned above, referring to FIG. 7.

Figure 7:
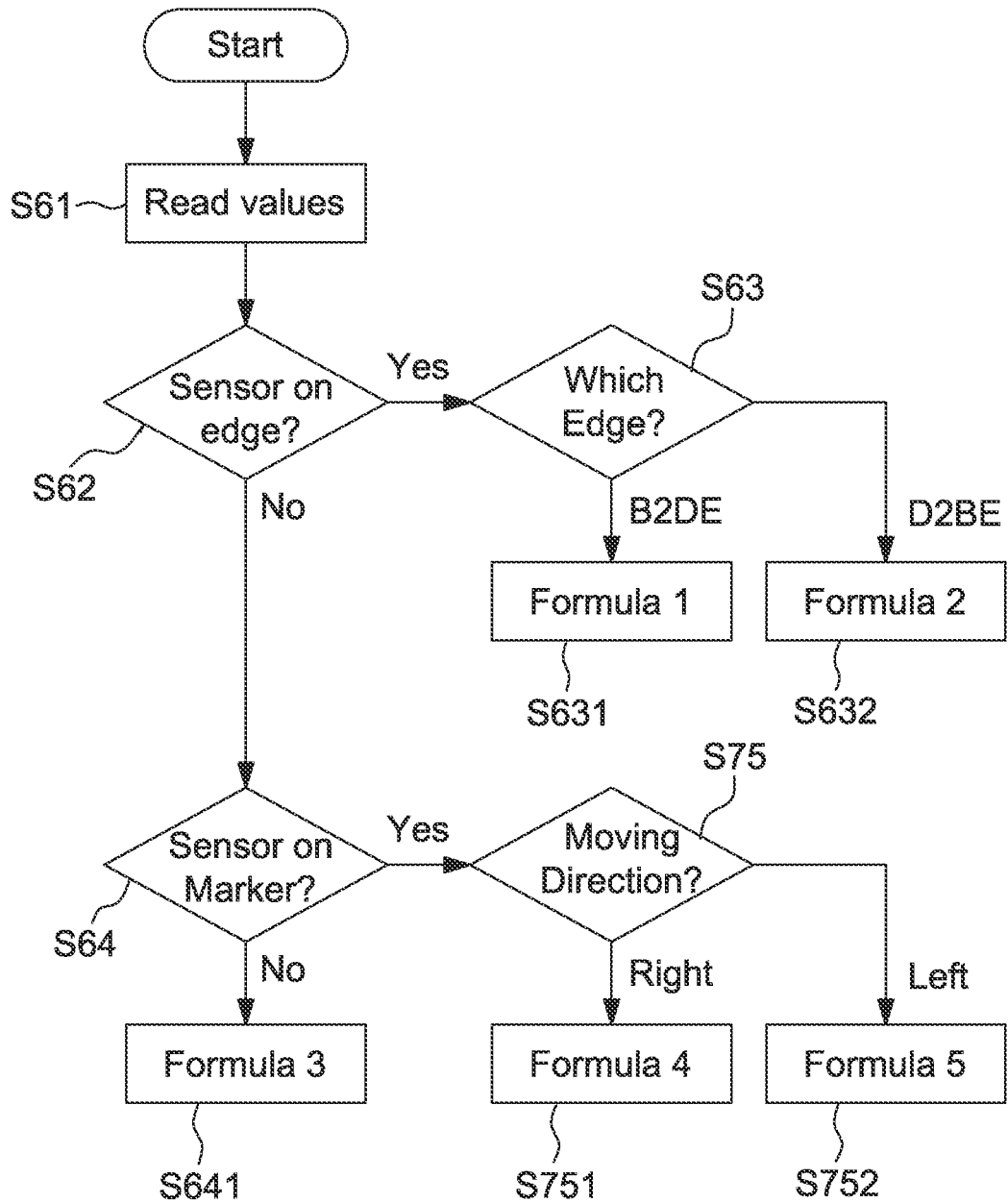
FIG. 7 is a flow chart of an operating method of an optical positioning system according to another embodiment of the present disclosure.

FIG. 7 is an operating method of an optical positioning system 100 of this embodiment. The steps identical to FIG. 6 are indicated by the same reference numbers. It is seen that only steps S75, S751 and S752 are different because a moving direction is used in operation instead of using the last passed edge.

It should be mentioned that although FIGS. 2-5 show that mark edges indicate integer positions, and marks (e.g., dark regions 11D) and spaces (e.g., bright regions 11B) indicate half positions, it is only intended to illustrate but not to limit the present disclosure. In other aspects, if the FOV starts at a point within a mark or a space, the mark edges are arranged to indicate a half position, and the marks and spaces are arranged to indicate an integer position.

In other embodiments, the optical positioning system 100 of the present disclosure further includes a light source (e.g., infrared LED, but not limited to) to illuminate the detected surface 11 having the marks 11D thereon to enhance contrast of the captured image frames IF.

It is appreciated that if the ratio mentioned above is calculated by dividing a shutter time of optical sensor 13 by an average value of image frame IF, the relationship between the ratio and the ratio threshold is reversed.

As mentioned above, an optical positioning system can detect a position of an optical sensor corresponding to a surface having marks. The present disclosure provides an optical positioning system (e.g., FIG. 1) and an operating method thereof (e.g., FIGS. 6-7) that can further determine an absolute position of an optical sensor corresponding to dark regions (at marks) and bright regions (not at marks) to double the positional accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical positioning system, comprising:
    a detected surface having interleaved bright regions and dark regions arranged in a transverse direction, and the bright regions and the dark regions having an identical width in the transverse direction;
    an optical sensor configured to capture an image frame of the detected surface within a field of view thereof and using a shutter time, wherein the detected surface and the optical sensor are configured to have a relative movement in the transverse direction; and
    a processor configured to
        calculate an average value of the image frame,
        determine whether the field of view is aligned with an edge between the bright regions and the dark regions according to a brightness distribution in the image frame, and
        compare a ratio between the average value and the shutter time with a ratio threshold to determine whether the field of view is aligned with one of the bright regions or the dark regions.

2. The optical positioning system as claimed in claim 1, wherein the field of view of the optical sensor in the transverse direction is smaller than the identical width.

3. The optical positioning system as claimed in claim 1, wherein
    a bright-to-dark edge is determined when brightness of a left part of the image frame is higher than that of a right part of the image frame, and
    a dark-to-bright edge is determined when the brightness of the left part of the image frame is lower than that of the right part of the image frame.

4. The optical positioning system as claimed in claim 3, further comprising a counter configured to count a number of edge pairs between the bright regions and the dark regions that the field of view passes, wherein
    when the field of view sequentially passes the bright-to-dark edge and the dark-to-bright edge, the counted number of edge pairs is increased by 1, and
    when the field of view sequentially passes the dark-to-bright edge and the bright-to-dark edge, the counted number of edge pairs is decreased by 1.

5. The optical positioning system as claimed in claim 4, wherein
    when the field of view is aligned with the bright-to-dark edge, the processor is further configured to calculate an integer position using 2×the counted number of edge pairs×the identical width, and
    when the field of view is aligned with the dark-to-bright edge, the processor is further configured to calculate the integer position using 2×(the counted number of edge pairs−1)×the identical width.

6. The optical positioning system as claimed in claim 4, wherein when the field of view is determined to be aligned with one of the bright regions or the dark regions and the ratio is larger than the ratio threshold, the processor is further configured to calculate a half position using (2×the counted number of edge pairs−0.5)×the identical width.

7. The optical positioning system as claimed in claim 4, further comprising a register configured to record a type of a last passed end, wherein
    when the field of view is determined to be aligned with one of the bright regions or the dark regions, the ratio is smaller than the ratio threshold and the recorded last passed edge is the bright-to-dark edge, the processor is further configured to calculate a half position using (2×the counted number of edge pairs+0.5)×the identical width, and
    when the field of view is determined to be aligned with one of the bright regions or the dark regions, the ratio is smaller than the ratio threshold and the recorded last passed edge is the dark-to-bright edge, the processor is further configured to calculate the half position using (2×(the counted number of edge pairs−1)+0.5)×the identical width.

8. An optical positioning system, comprising:
    a detected surface having interleaved bright regions and dark regions arranged in a transverse direction, and the bright regions and the dark regions having an identical width in the transverse direction;
    an optical sensor configured to capture an image frame of the detected surface within a field of view thereof and using a shutter time, wherein the detected surface and the optical sensor are configured to have a relative movement in the transverse direction;
    a counter configured to count a number of edge pairs between the bright regions and the dark regions that the field of view passes;
    a register configured to record a type of a last passed edge; and
    a processor configured to
        calculate an average value of the image frame,
        compare a ratio between the average value and the shutter time with a ratio threshold to determine whether the field of view is aligned with one of the bright regions or the dark regions, and
        determine a half position according to the counted number of edge pairs, the last passed edge and the ratio when the field of view is determined to be aligned with one of the bright regions or the dark regions.

9. The optical positioning system as claimed in claim 8, wherein the field of view of the optical sensor in the transverse direction is smaller than the identical width.

10. The optical positioning system as claimed in claim 8, wherein
a bright-to-dark edge is determined when brightness of a left part of the image frame is higher than that of a right part of the image frame, and
a dark-to-bright edge is determined when the brightness of the left part of the image frame is lower than that of the right part of the image frame.

11. The optical positioning system as claimed in claim 10, wherein
when the field of view sequentially passes the bright-to-dark edge and the dark-to-bright edge, the counted number of edge pairs is increased by 1, and
when the field of view sequentially passes the dark-to-bright edge and the bright-to-dark edge, the counted number of edge pairs is decreased by 1.

12. The optical positioning system as claimed in claim 10, wherein when the ratio is larger than the ratio threshold, the processor is configured to calculate the half position using (2×the counted number of edge pairs−0.5)×the identical width.

13. The optical positioning system as claimed in claim 10, wherein
when the ratio is smaller than the ratio threshold and the recorded last passed edge is the bright-to-dark edge, the processor is configured to calculate the half position using (2×the counted number of edge pairs+0.5)×the identical width, and
when the ratio is smaller than the ratio threshold and the recorded last passed edge is the dark-to-bright edge, the processor is configured to calculate the half position using (2×(the counted number of edge pairs−1)+0.5)×the identical width.

14. An optical positioning system, comprising:
a detected surface having interleaved bright regions and dark regions arranged in a transverse direction, and the bright regions and the dark regions having an identical width in the transverse direction;
an optical sensor configured to capture image frames of the detected surface within a field of view thereof and using a shutter time, wherein the detected surface and the optical sensor are configured to have a relative movement in the transverse direction;
a counter configured to count a number of edge pairs between the bright regions and the dark regions that the field of view passes; and
a processor configured to
calculate an average value of a current image frame and a moving direction according to multiple image frames,
compare a ratio between the average value and the shutter time with a ratio threshold to determine whether the field of view is aligned with one of the bright regions or the dark regions, and
determine a half position according to the counted number of edge pairs, the moving direction and the ratio when the field of view is determined to be aligned with one of the bright regions or the dark regions.

15. The optical positioning system as claimed in claim 14, wherein the field of view of the optical sensor in the transverse direction is smaller than the identical width.

16. The optical positioning system as claimed in claim 14, wherein
a bright-to-dark edge is determined when brightness of a left part of the current image frame is higher than that of a right part of the current image frame, and
a dark-to-bright edge is determined when the brightness of the left part of the current image frame is lower than that of the right part of the current image frame.

17. The optical positioning system as claimed in claim 16, wherein
when the field of view sequentially passes the bright-to-dark edge and the dark-to-bright edge, the counted number of edge pairs is increased by 1, and
when the field of view sequentially passes the dark-to-bright edge and the bright-to-dark edge, the counted number of edge pairs is decreased by 1.

18. The optical positioning system as claimed in claim 16, wherein when the ratio is larger than the ratio threshold, the processor is configured to calculate the half position using (2×the counted number of edge pairs−0.5)×the identical width.

19. The optical positioning system as claimed in claim 16, wherein
when the ratio is smaller than the ratio threshold and the moving direction is a right direction, the processor is configured to calculate the half position using (2×the counted number of edge pairs+0.5)×the identical width, and
when the ratio is smaller than the ratio threshold and the moving direction is a left direction, the processor is configured to calculate the half position using (2×(the counted number of edge pairs−1)+0.5)×the identical width.

20. The optical positioning system as claimed in claim 14, wherein the processor is configured to calculate the moving direction according to increment or decrement of a high brightness area corresponding to the bright region or a low brightness area corresponding to the dark region between the multiple image frames.

\* \* \* \* \*